United States Patent
Steinka et al.

(10) Patent No.: US 6,285,680 B1
(45) Date of Patent: *Sep. 4, 2001

(54) CENTRAL SITE CALL ROUTING APPARATUS AND METHOD

(75) Inventors: Bradford R. Steinka, Franklin; Edward J. Meaney, Bridgewater, both of MA (US)

(73) Assignee: Microcom Systems, Inc., Norwood, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,193

(22) Filed: Mar. 27, 1997

(51) Int. Cl.[7] .......................... H04L 12/28; H04L 12/66; H04M 11/00

(52) U.S. Cl. .................. 370/431; 370/352; 370/401; 379/93.05; 379/93.32; 710/129

(58) Field of Search .................... 370/257, 397, 370/349, 352, 431, 401; 395/200.72; 379/93.14, 93.32, 93.29, 93.05; 712/35; 710/129

(56) References Cited

U.S. PATENT DOCUMENTS

| | | | |
|---|---|---|---|
| 4,348,554 | | 9/1982 | Asmuth ............................. 179/18 B |
| 5,088,032 | * | 2/1992 | Bosack ............................ 395/200.72 |
| 5,179,555 | | 1/1993 | Videlock et al. ................. 370/85.13 |
| 5,291,492 | | 3/1994 | Andrews et al. ................. 370/110.1 |
| 5,394,463 | | 2/1995 | Fischell et al. ...................... 379/201 |
| 5,418,844 | | 5/1995 | Morrisey et al. .................... 379/207 |
| 5,432,785 | | 7/1995 | Ahmed et al. ........................ 370/60.1 |
| 5,459,722 | | 10/1995 | Sherif ................................. 370/60.1 |
| 5,490,212 | | 2/1996 | Lautenschlager .................... 379/225 |
| 5,524,146 | | 6/1996 | Morrisey et al. .................... 379/207 |
| 5,553,130 | | 9/1996 | Turner ................................. 379/220 |
| 5,555,244 | * | 9/1996 | Gupta et al. .......................... 370/397 |
| 5,577,105 | | 11/1996 | Baum et al. .............................. 379/93 |
| 5,761,281 | * | 6/1998 | Baum et al. ......................... 379/93.29 |
| 5,841,842 | * | 11/1998 | Baum et al. ........................ 379/93.32 |
| 5,852,655 | * | 12/1998 | McHale et al. .................... 379/93.14 |
| 5,864,542 | * | 1/1999 | Gupta et al. ........................... 370/257 |
| 5,933,614 | * | 8/1999 | Tavallaei et al. ..................... 710/129 |
| 5,987,590 | * | 11/1999 | Wing So ................................ 712/35 |
| 6,091,737 | * | 7/2000 | Hong et al. ........................... 370/431 |

FOREIGN PATENT DOCUMENTS

0732835 A2   9/1996 (EP) .

OTHER PUBLICATIONS

Singh, "Heterogenous internetworking" 1, 17, 24, 1996, Prentice Hall Ptr. USA XP–002121993, pp. 16–18.

\* cited by examiner

*Primary Examiner*—Hassan Kizou
*Assistant Examiner*—John Pezzlo
(74) *Attorney, Agent, or Firm*—Mintz, Levin, Cohn, ferris, Glovsky and Popeo, P.C.

(57) ABSTRACT

A central site communication system selectively establishes a data connection between a remote system and one of group of host systems as a function of information about the remote system. The communication system can be connected to a digital data network such as via an ISDN or T1 network connection and the remote system can be connected to either the digital data network directly or through a Public Switch Telephone Network (PSTN) analog connection. The host system can be connect to the communication system via a LAN medium and utilize an IP network and a data tunneling protocol to establish a data connection between the remote system and the host system. The information about the remote system can include the telephone number of the remote system, the telephone number dialed by the remote system to connect with host system, the protocol used by the remote system or the data transmitted by the remote system to the host system.

48 Claims, 4 Drawing Sheets

ND SITE CALL ROUTING
APPARATUS AND METHOD

COPYRIGHT NOTICE

Copyright, 1995, 1996, 1997, Microcom Systems, Inc. A portion of the disclosure of this patent document contains material which is subject to copyright protection. The copyright owner has no objection to reproduction by anyone of the patent document or the patent disclosure, as it appears in the U.S. Patent and Trademark Office patent file or records, but otherwise reserves all copyright rights whatsoever.

CROSS-REFERENCE TO RELATED APPLICATIONS

Not Applicable

STATEMENT REGARDING FEDERALLY SPONSORED RESEARCH

Not Applicable

REFERENCE TO APPENDIX

This application includes Appendix A comprising 392 pages.

1. Field of the Invention

This invention relates to central site telecommunications systems and more particularly, to a device capable of processing and routing calls originating from both digital and analog networks to create connections with selected LAN and WAN resources.

2. Background of the Invention

With the growth of data communications today, organizations are finding that they are having to support a broad range of remote access and wide area network (WAN) services. For example, a typical corporate network can provide one WAN service connection for satellite offices to provide local area network (LAN) connectivity, another service connection for remote users such as a mobile sales force, yet another for telecommuters and still another for customers. Typically, each of these service connections supports only one type of WAN technology, such as the Public Switched Telephone Network (PSTN) or the Integrated Services Digital Network (ISDN). In addition each different type of service connection requires a separate piece of hardware at the corporate site to support the connection. Thus, the corporate network administrator must manage several different WAN connections and services.

With the growth of the Internet, the local telephone companies and Internet service providers (ISPs) are finding that their WAN connection services are being utilized to capacity. Typically, these organizations provide a separate telephone number for each of the services they provide. Thus, depending upon the type of connection required by the remote user, the remote user will be given a telephone number dedicated to providing a specific service. In the case of a local telephone company or other provider of virtual private network services, each user or group of users is assigned to a dedicated telephone number in order to control access. As a result, the telephone companies are running out of telephone numbers and service capacity.

The most common WAN services include the PSTN, ISDN and T1 services. Each of these services permits the transfer of digital data between a remote system and a host system, however, the benefits and disadvantages of each of these types WAN services are different, such that an organization's selection of WAN services will vary depending upon the organization's requirements.

The PSTN is a network designed primarily for the transmission of voice information an d the subscriber accesses the network through an analog network connection. One the benefits of the PSTN is that it provides the broadest area of access at a relatively low price. Through the use of modems, these networks are capable of transmitting data, although even using the state of the art technology the data bandwidth is very limited. In order to meet the demand for increased bandwidth, other services such as integrated services digital network (ISDN) and T1 are now being offered.

T1 service is a digital network service designed to allow higher speed data communication for commercial users and c an provide data rates up to 1.544 Mbps. T1 is also available as a channelized service which allows for multiple data connections over a single physical connection, thus permitting more efficient use of existing hardware. Channelized T1 (herein referred to as T1) service provides up to 24 separate data connections over a single physical connection. T1 service is not available in all areas and is generally limited to commercial users and thus not available to residential users such a telecommuters and segments of the consumer market.

The ISDN is a switched digital network that enables the local telephone company to provide a range of services in order to meet the needs of their users and enable the telephone company to utilize their resources (circuits and switches) efficiently. A switched network is a network that provides a choice of services for establishing a circuit or network connection between parties. Those services typically include circuit switching services and packet switching services; however, other services such as asynchronous transfer mode (ATM) or frame relay technology are also available in some areas. The ISDN can provide the available services to the user on an as needed basis as well as enables the user to increase or decrease bandwidth on demand. ISDN service is not available in all areas and the costs in some areas make the benefit of ISDN's increased data rate only economical to users with very high bandwidth requirements.

ISDN service usually comprises one D-channel and one or more B-channels. The D-channel is used to setup the call with the ISDN service provider central office and to provide all the call control signals for each of the B-channels. The user contacts the telephone company via the D-channel in order to establish a connection with a remote user across the network as well as request different types of services provided by the network. Typically, the D-channel data rate can be 16K or 64K bits per second (bps). The B-channel or Bearer Channel is the basic user channel for the transfer of information and can provide a data rate of up to 64K bits per second (bps) per channel. It can be used to carry digital data, analog signals in the form of digitized voice, or a combination of the two. More than one B-channel can be combined to achieve higher data rates. Essentially, three kinds of circuit or network connections can be setup over a B-channel: circuit switched, packet switched and semipermanent (equivalent to a leased line). In addition to or instead of B-channels, H-channels, providing data rates greater than 64 Kbps, can be provided.

Basic ISDN access service, intended for residential and small office subscribers, is provided by what is called a Basic Rate Interface (BRI) which typically consists of two B-channels and one D-channel. A Primary Rate Interface (PRI), intended for commercial subscribers, typically consists of 23 or 30 B-channels and one D-channel. The PRI may also include H-channels instead of or in addition to B-channels.

Currently, the PSTN, T1 and the ISDN services coexist in the market place. The majority of local telephone companies can provide subscribers with access to either service in order to meet the subscriber's needs. These local telephone companies also provide an interface between the PSTN, the ISDN or the T1 networks in order to permit subscribers connected to one network to establish connections with subscribers on the other network. Without such an interface, subscribers connected to the ISDN, for example, would not be able to call subscribers connected to the PSTN and vice versa.

This PSTN-ISDN/T1 interface includes the equipment necessary to convert the PSTN signal to an ISDN or T1 compatible signal and vice versa. Typically, data transferred on an analog network is transmitted in the form of modulated analog signals. Common industry standard modulation schemes are described in ITU-T V0.32 and V0.34 Recommendations. At the interface between the digital and analog networks, the modulated analog signals are converted to a Pulse Coded Modulation (PCM) digital data stream for transmission across the digital network and the PCM digital data stream is converted to a modulated analog signal for transmission across the analog network.

ISDN service use s the D-channel to notify a party of an incoming call. One of the features available with ISDN service is that a party receiving an incoming call can receive information about the incoming call including the telephone number of the calling party (caller identification) as well as the number dialed. Identification of the number dialed is useful because multiple numbers can be assigned to a single subscriber of ISDN services. Typically, this information is used by the corporate PBX to identify the called party.

Currently, organizations such as corporations utilize a separate WAN facility or service for each possible type of remote network connection. For example, analog dialup connectivity (PSTN) is typically provided by a modem server utilizing banks of analog modems, digital dialup connectivity, such as ISDN and T1 services, are provided by separate ISDN and T1 facilities respectively. Typically, each of these devices is connected to the corporate LAN via a separate communication or remote access server.

This configuration has several disadvantages. Because the different facilities are distributed across t he corporate LAN, configuration and management of the different facilities is difficult and time consuming. In addition, calls routed between these facilities consume scarce bandwidth from the corporate LAN. Another disadvantage is the cost of subscribing to three separate services which are not utilized to capacity.

OBJECTIONS OF THE INVENTION

Accordingly, it is an object of this invention to provide a communication system that provides remote access to multiple host resources through a common WAN connection.

It is another object of the invention to provide a communication system that provides selective remote access to multiple host resources through a common WAN connection.

It is another object of the invention to provide a communication system that provides selective remote access to multiple host resources through a common WAN connection where access can be controlled based upon information characteristic of the remote system requesting access and/or the type of WAN services being used by the remote system.

It is yet another object of the invention to provide a communication system that provides selective remote access to multiple host resources through a common WAN connection such as an ISDN or T1 connection where access can be controlled based upon information available from the WAN such as the telephone number of the remote system or the number dialed by the remote system or information about the connection initiated by the remote system such as the communication protocol used by the remote system or data such as a log in identifier or password transmitted by the remote system.

SUMMARY OF THE INVENTION

In accordance with the present invention, a communication system is disclosed which incorporates into a single device, an apparatus for receiving multiple incoming calls through one public network service connection from remote devices requiring different types of network access to multiple host resources and for establishing a connection and routing the data stream of that call a predetermined host system. The connection is established to a host system based upon information characteristic of the remote system, such as the remote system's network identifier, the destination network identifier used by the remote system to establish a connection with the communication system, the data communication protocol used by the remote system or an access code, such as a log-in identifier or password sent by the remote system. The communication system can also provide controlled remote dial-out capability to enable a host system, such as a mail server or users at workstations connected to a LAN establish a data connection to a remote system across the public network service connection.

The communication system is connected to a first network through a first network connection such as an ISDN or T1 connection and the remote system can be connected to the same network through either an ISDN or T1 network connection or a second network such as a PSTN network connection. The local telephone company provides an interconnect between the two networks (the ISDN or T1 and the PSTN, for example) and handles the protocol and data modulation changes such that they are essentially transparent to the subscriber.

The communication system includes a first network interface that is capable of processing the connection with the first network and transferring the data and the information characteristic of the remote system to the call processing system. The communication system also includes one or more host interfaces which connect the communication system to a plurality of host systems through one of several different host connection medium such as a LAN media or a serial or parallel communication medium.

The communication system also includes the call processing system which receives the information characteristic of the remote system, determines if any further processing is necessary and determines which host system to establish a connection as a function of the information characteristic of the remote system. The call processing system can also establish the connection with the appropriate host system across the host connection medium. Thus, data received from the remote system over the first network is transferred from the first network interface to the host interface which transfers the data to a specified host system. Data received from the host system over the host connection medium is transferred from the host interface to the first network interface which transfers the data to the remote system over the first network. Preferably, the communication system establishes a data tunnel to a host system which bidirectionally transfers the data between the remote system and the host system with higher layer protocol information intact.

The communication system can also include a system for determining whether the remote system is connected to the first network or connected to a different network such as for example the analog network in order to determine whether further processing by a second or subsequent network interface is required. If the remote system is connected to the first network, first network interface terminates the first network connection and transfers the data to the call processing system to determine which host system to receive the connection. If the remote system is connected to a different network (such as an analog network), the first network interface terminates the digital network connection but the call processing system routes the data over a data bus to a second network interface (such as an analog network interface) for further processing. Similarly, if additional processing is needed, the data can be routed over the data bus to a third or subsequent interface. The call processing system then determines the host system and establishes the connection with the host system.

The call processing system can be centrally located in the system and perform the host system connection determination separately from the network interfaces. Alternatively, the call processing system can be distributed wherein each network interface includes a separate call processing system which manages the host system connection determination and connection establishment for each interface module. The system can further include a system controller which stores the criterion for connection establishment and transfers this information to the individual call processing systems. Alternatively, the criterion for connection establishment can be stored at one of the host systems and transferred to each call processing system over a host connection medium.

In accordance with the invention, a method is disclosed for establishing a connection between a remote system and one of a plurality of host systems, wherein the remote system is connected to either a first network or a second network and the plurality of host systems are connected to a communication system which is connected to the first network. The first network and the second network are interconnected and the interface between the networks provides the necessary signal and protocol conversion to make the conversion transparent to the network subscriber.

The method includes the steps of establishing a data connection across the first network between the remote system and the communication system which enables data to be transmitted bidirectionally; receiving information characteristic of the remote system from the first network; and establishing a bidirectional data connection between the communication system and one of said host systems as a function of the characteristic information.

The method can further include the steps of comparing the information characteristic of the remote system with a table containing possible characteristic information and corresponding host systems and establishing a data connection between said communication system and a corresponding host system if the characteristic information matches the possible characteristic information from the table.

The information characteristic of remote system can include a remote system network identifier such as the remote systems telephone number and the method can include establishing a connection with a host system as function of the remote system network identifier.

The information characteristic of the remote system can include the destination system network identifier such as the telephone number dialed by the remote system and the method can include establishing a connection with a host system as function of the destination system network identifier.

The information characteristic of the remote system can include the communication protocol used by remote system to communicate with communication system over the digital network and the method can include sensing the protocol used by the remote system and establishing a connection with a host system as function of the protocol sensed.

The information characteristic of the remote system can include data transmitted by the remote system and the method can include receiving data from the remote system and establishing a connection with a host system as a function of the data received from the remote system.

The method can further include the step of establishing a data tunnel utilizing a data tunneling protocol to transfer data between the remote system and the host system with the higher layer protocol information intact.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

In accordance with the present invention, a Central site Communication System is disclosed which incorporates into a single device, an apparatus for receiving incoming calls through one service connection with the telephone company central office and for establishing a bidirectional data connection with a predetermined host system based upon information about the remote system that initiated the incoming call such as the number called or the calling party's telephone number. The communication system can also provide controlled remote dial-out services which permit a host system such as a mail server or users at workstations connected to a LAN establish a data connection to a remote system across a public network such as an ISDN or PSTN service connection as a function of the information characteristic of the host system or user workstation that initiated the call.

Figure 1:
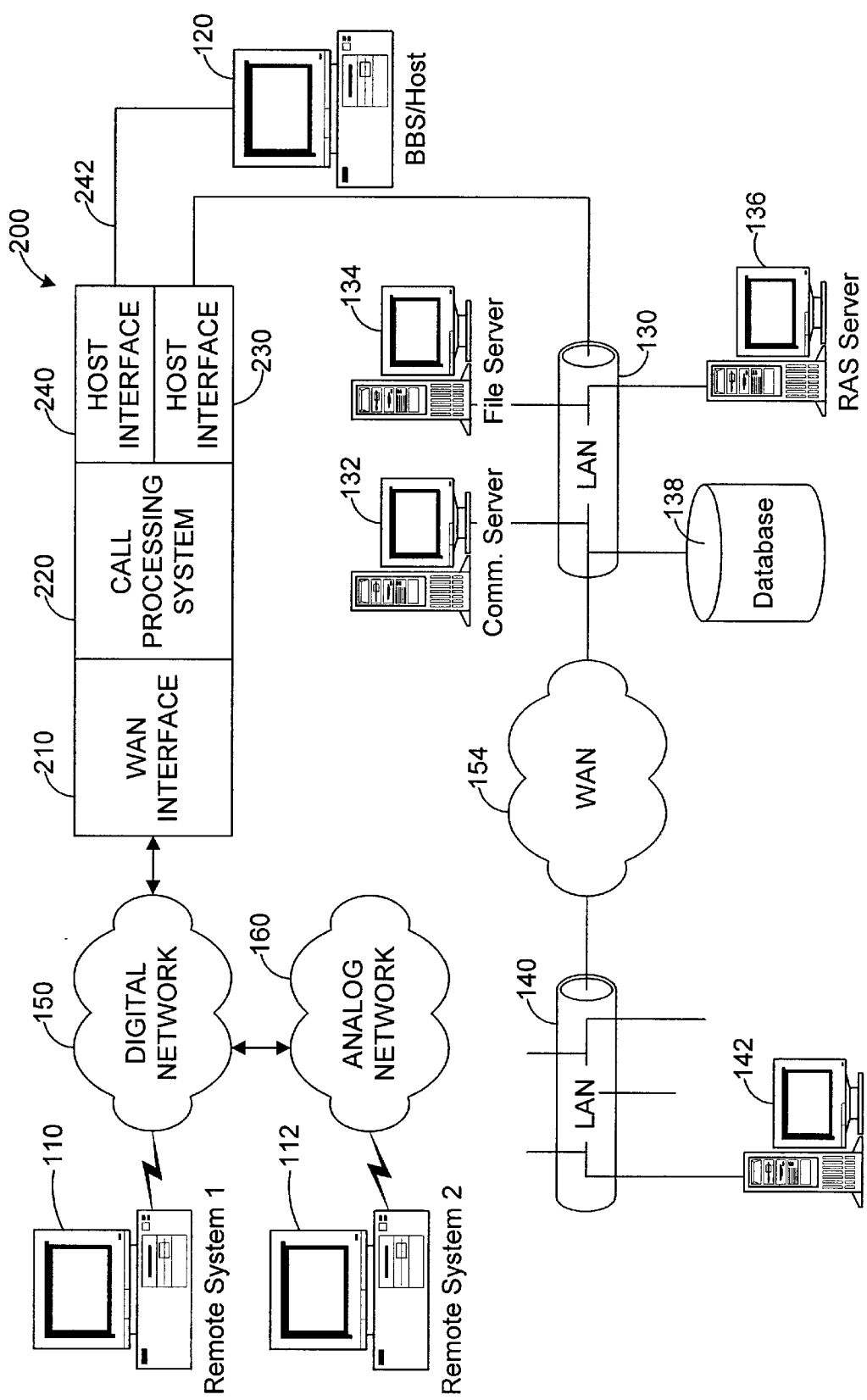
FIG. 1 is block diagram showing a central site call routing apparatus in accordance with one embodiment of the invention.

FIG. 1 shows a central site communication system 200 in accordance with the present invention. Communication system 200 provides a data connection which allows data to be transferred bidirectionally between remote systems 110, 112 and host systems 120, 132, 134, 136, 138, 142. The communication system 200 includes a Wide Area Network (WAN) interface 210 for connecting the communication system 200 to a WAN facility which includes a Digital Network 150. The WAN facility can also include an Analog Network 160 and other types of digital and/or analog networks (not shown). Alternatively, the communication system 200 can include a WAN interface for connecting the communication system 200 to the Analog Network 160. The communication system 200 also includes one or more host interfaces 230, 240 for connecting the communication system 200 to one or more host systems, such as a Bulletin Board Service (BBS) Host 120, a Communication Server 132, File Server 134, Remote Access Server (RAS) 136, Database Server 138, remotely located Communication Server 142 over one or more types of host connection media 232, 242, 130, 154, 140.

The WAN interface 210 terminates the physical connection with the WAN facility 150. The WAN interface 210 can also terminate the data link layer and network layer connections and transfer data to and from the call processing system 220. The WAN interface 210 also communicates with the call processing system 220 to exchange call signaling information, for example the remote system's telephone number, the number dialed by the remote system or other information.

In one preferred embodiment, the communication system 200 is connected to the digital network 150 via an ISDN service connection and the WAN interface 210 provides support for two Primary Rate Interface (PRI) connections. ISDN service provides call setup messages which contain call signaling information, for example, Q0.931 messages, and which can be received by WAN interface 210. Alternatively, the communication system 200 can be connected to the digital network 150 via T1 service and the WAN interface can provide support for two T1 connections. T1 service provides Automatic Number Identification (ANI or caller identification) and Dialed Number Identification Service (DNIS) and this and other signaling information can be received by the WAN interface 210.

The host interface 230 is a LAN interface that connects the communication system 200 and host systems 132, 134, 136, 138 via a LAN medium 232, such as coaxial cable, unshielded twisted pair (UTP) cable or fiber-optic cable, using any well known LAN specification (such as Ethernet or Token Ring) and using a network protocol (such as IP) to connect to the corporate LAN 130. In addition, the LAN interface can also permit connectivity to a remote host system that is connected to the corporate LAN 130 via a WAN facility 154 (either public or private) such as, for example, a communications server 142 located on a remote section of the corporate LAN 140.

Host interface 240 provides a more direct connection to a host system 120. In one preferred embodiment, host interface 240 can provide either a serial or parallel asynchronous connection. Preferably, the serial connection is a serial interface such as an Electronic Industries Association RS-232C or RS-422 serial interface and the parallel connection is parallel interface such as that disclosed in commonly owned U.S. Pat. No. 5,644,593 (U.S. application Ser. No. 08/300,490) which is hereby incorporated by reference.

The call processing system (CPS) 220 can use information characteristic of the remote system to determine which host system to establish a connection with and to determine the type of connection to establish and/or the type of protocol to use. The information characteristic of the remote system can include the telephone number called by the remote system, the remote system's telephone number, the data communication protocol used by the remote system to connect to the host system, received data transmitted by the remote system prior to a connection being established such as a log-in identifier, password or E-mail address (login ID and domain name) and/or other information such as can be provided by protocol data units received by the WAN interface 210.

The WAN interface module can include a protocol sensing subsystem such as that disclosed in commonly owned U.S. patent application Ser. No. 08/599183 entitled "Method of and Apparatus for Detecting Switched Network Protocols" which is hereby incorporated by reference. The protocol sensing subsystem can monitor the incoming data frames received from the digital network to determine if the frames correspond to valid frames of a data protocol supported by the WAN interface and enable the WAN interface to establish a data connection between the remote system and the communication system using the detected protocol and establish a data connection between the communication system and a designated host system as function of the network protocol supported by the host system. In the preferred embodiment, the protocol sensing subsystem can detect Synchronous Point-to-Point Protocol (PPP), Asynchronous PPP and Serial Line Internet Protocol (SLIP) in addition to the X0.75/LAPB, V0.120 and transparent HDLC protocols disclosed in U.S. patent application Ser. No. 08/599183 identified above.

The call processing system can also establish host connections as function of the data and/or connection load of a given group of host systems. The case of a provider of virtual private network (VPN) or Internet services, the service provider can utilize several host systems to process or manage network connections to the services provided. By monitoring the number of remote systems connected to each host system and the data load associated with each connection at any given time, the CPS can allocate connections to balance the data and/or connection load over two or more host systems or distribute the data and/or connection load over two or more host systems in accordance with specific provider requirements.

The WAN interface 210 of the communication system 200 can include several types of modules for processing calls that originate from other types of networks. For example, as shown in FIG. 1, the communication system 200 is connected to a digital network 150 such as an ISDN and the ISDN is connected to an analog network 160 such as a Public Switched Telephone Network (PSTN). Typically, the telephone company provides the interface between the ISDN and the PSTN which performs the necessary signal conversions such that the data transfer is transparent to the subscriber. Thus, when the remote system 112 connected to the analog network (PSTN) initiates a connection to the communication system 200, the call is routed through the digital network (ISDN) and the analog modem signal is converted to a digital ISDN signal, typically through a process known as A-law or $\mu$-law encoding. However, at the WAN interface, the ISDN data that is extracted by an ISDN module must be transferred to another WAN interface module, such as a modem module for further processing. The modem module extracts the original data transmitted by the remote system 112 using an A-law or $\mu$-law decoding process. Preferably, the WAN interface includes a data bus (not shown) which allows the data stream to be transferred between the modules to enable further processing of the data received from the WAN facility.

The communication system 200 can also include a remote detection system for determining whether the remote system is connected to the digital network 150 or the analog network 160. The remote detection system can be part of the CPS 220 or it can be a separate system (not shown). One method of determining whether a remote system is connected to the digital network or an analog network is described in commonly owned U.S. Pat. No. 5,134,611, entitled "Analog/Digital Data Device and Method" which is hereby incorporated by reference. The remote detection system can be used by the communication system to determine whether to the WAN interface needs to utilize several modules and the data to process the connection with a particular remote system 112.

Alternatively, the communication system 200 can use the information characteristic of the remote system to determine whether the remote system is connected to a different network (such as an analog network) than the communication system 200 to determine whether further processing of the data signals received from the digital network is required by a second or subsequent WAN interface module. For example, if all telephone numbers of a certain exchange are known to originate on the PSTN, all calls received from a remote system having a telephone number from that exchange can be automatically connected to a modem module for further processing.

In accordance with the invention, the CPS 220 can be a centralized module that stores the call routing parameters, evaluates each call and determines an appropriate host connection as a function of the parameters and external information. In this embodiment, each module of the WAN interface can include a subsystem for connecting the module to the data bus and a subsystem for connecting the module to each of the host interfaces and establishing a connection with the host system. Alternatively, the CPS 220 can provide the connection between the WAN interface 210 and the host interfaces 230, 240 and include a subsystem for establishing the connection with each host system.

Figure 2:
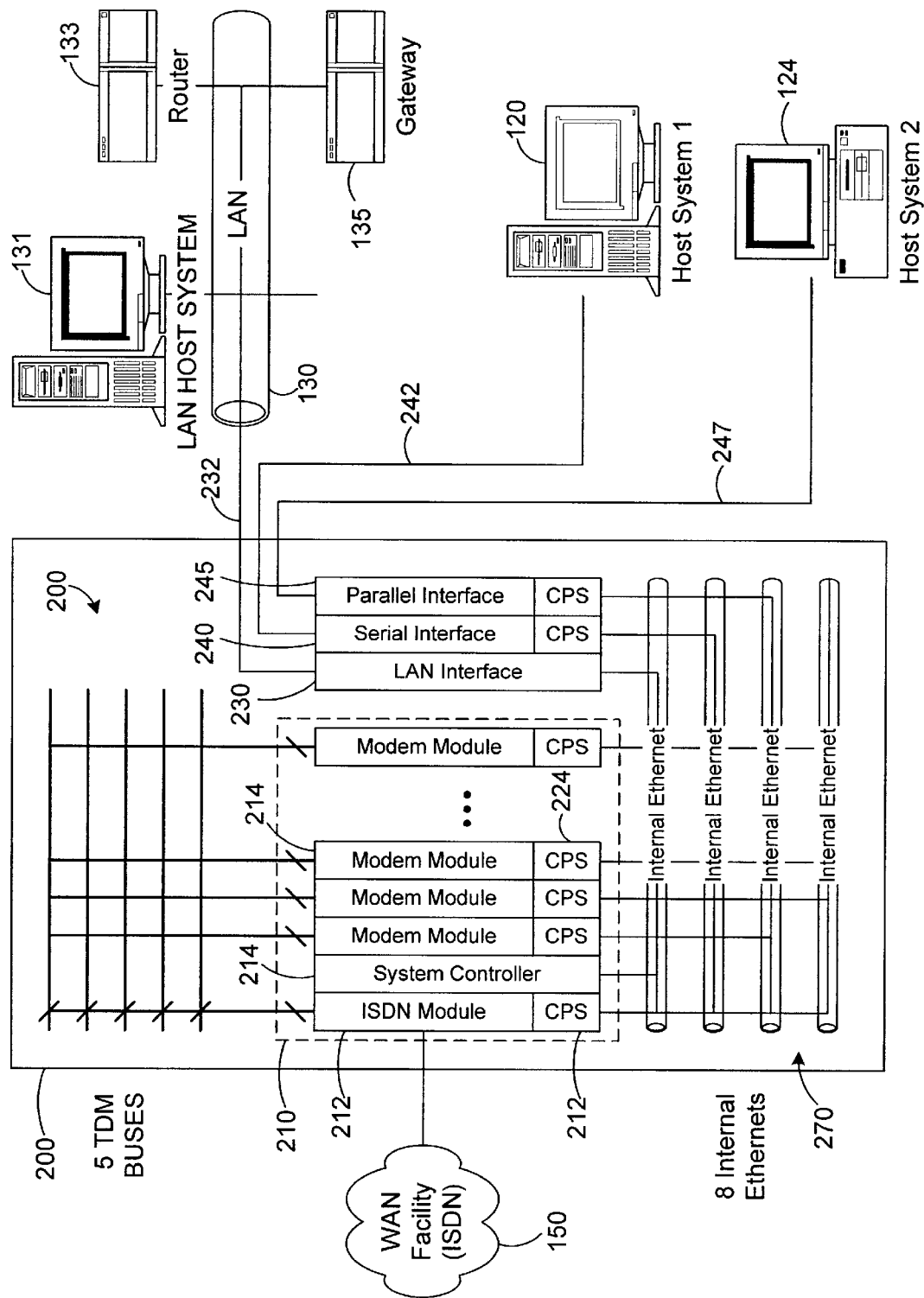
FIG. 2 is a block diagram showing a central site call routing apparatus in accordance with one preferred embodiment of the invention.

FIG. 2 shows a preferred embodiment of the present invention in which the CPS is distributed whereby the WAN interface includes several WAN interface modules 212, 214 and each module includes a separate CPS 222, 224. In this embodiment, the communication system 200 also includes a system controller 250 which stores the call routing parameters and distributes them to the individual call processing systems.

In accordance with a preferred embodiment of the invention, the WAN interface 210 of the communication system 200 includes an ISDN module 212 which provides digital connectivity between the communication system 200 and an ISDN 150. The WAN interface also includes one or more modem modules 214 which provide further processing in case where the remote system is connected to an analog network such as a PSTN using an analog modem. The communication system 200 also includes a data bus 260 which interconnects each of the WAN interface modules and allows the incoming data stream to be transferred from a first WAN interface module to a second between them in order to permit further processing by subsequent WAN interface modules and allows an outgoing data stream to be transferred from the second WAN interface module to the first.

Each of the WAN interface modules 212, 214 includes a CPS 222, 224 respectively. The CPS 222, 224 receives the information characteristic of the remote system and establishes a data connection between the remote system and a host system as a function of this information. The communication system 200 also includes a data bus 270 which interconnects each of the WAN interface modules 212, 214 and the host interfaces 230, 240, 245. Data bus 270 allows the WAN interface modules to communicate with each other and exchange signaling and other information in order facilitate to further processing by subsequent WAN interface modules.

In one preferred embodiment, the communication system is connected an ISDN and remote system is connected to a PSTN. Calls that originate from the PSTN require special processing. This is because the PSTN is an analog network and digital data is transmitted using modems to create a modulated analog signal that is demodulated by a remote modem and converted back to digital data. In order for a call originating from the PSTN to connect to communication system it must cross through the ISDN and therefore, the analog modem signal must be converted to a digital data signal. Typically, this is accomplished by equipment at the telephone company central office. Similarly, data transmitted from the communication system to the remote system passes through the PSTN/ISDN interface wherein the digital ISDN data is converted to an analog modem signal which contains the original data transmitted by the communication system.

Regardless of whether a call is received by or initiated by the communication system, the CPS 222 must first determine whether the remote system is connected to the ISDN or PSTN. This can be accomplished by examining the bearer capability of the incoming call as described in U.S. Pat. No. 5,134,611. Once this determination is made, CPS 222 and CPS 224 will route the incoming and outgoing data streams over data bus 260 between the appropriate WAN interface modules 212 and 214 to insure that the data transferred between the host system and remote system is formatted appropriately. CPS 222 and CPS 224 can use the data bus 270 to communicate with each other to exchange signaling data and other information necessary to coordinate processing between the two interface modules. Additional interface modules can be utilized in a similar fashion as necessary to enable further processing.

If the incoming data stream is digital data (originating from a remote system connected directly to the ISDN), the data is processed by the ISDN WAN interface module. Preferably, the ISDN WAN interface module typically includes an HDLC controller which extracts the digital data from the incoming digital data stream and a microprocessor (such as a 68EC040 available from Motorola Semiconductor, Marlborough, Mass.) which performs the CPS functions and stores the data in memory. Subsequently, the data can be transferred to a host system. Data received from a host system is stored in memory and encapsulated in HDLC frames by the HDLC controller. The HDLC frames comprise the outgoing data stream transmitted back to the remote system.

If the incoming digital data stream originated from a remote system that is connected to an analog network, the data stream must be routed to a WAN interface module 214 which includes a digital modem. The digital modem includes a Digital Signal Processor (DSP) operating under microprocessor control which processes the data stream using an A-law or $\mu$-law decoding process to convert the digital data stream to a data stream containing the original digital data transmitted by the remote system. Similarly, outgoing data from the host system to the remote system is converted using an A-law or $\mu$-law encoding process to produce a digital data stream.

The host interfaces include a LAN host interface 230 for connecting the communication system 200 to LAN 130 based host systems 131, 133, 135 over a LAN medium 232. Other host interfaces include a serial host interface 240 for connecting the communication system 200 to a host system 120 over a serial interface medium 242 and a parallel host interface 245 for connecting the communication system 200 to a host system 124 over a parallel interface medium 247.

In one preferred embodiment, the ISDN module provides for two PRI connections which enables the communication system to establish a total of 46 connections (23 per PRI connection) with remote systems. In this embodiment, the communication system 200 can include any number of modem modules 214 depending upon the anticipated maximum number connections needed from remote systems on the analog network. In the preferred embodiment, the communication system 200 includes 48 modem modules.

Preferably, data bus 260 includes 5 time division multiplexed (TDM) data buses and provides circuitry to enable each of the 23 channels of a PRI connection (or each of the 24 channels of a T1 connection) to be assigned to a time slot on any one of the 5 TDM data buses 260. Each of the modem modules 214 is connected one of the TDM data buses 260 and can be selectively assigned to any one of the time slots that corresponds to each of the 23 channels of the PRI connection (or 24 channels of the T1 connection). Thus, the TDM data buses 260 enable each of the WAN interface modules to communicate and transfer data among the modules.

In one preferred embodiment, the data bus 270 includes 8 internal Ethernet network segments that enable the CPS of each of the WAN interface modules 212, 214 to establish a connection with one of the host systems. In this embodiment, the host systems can be connected to a common LAN medium and connections between the communication system 200 and a host system can be established through the LAN interface 230 which is a LAN hub or repeater. Preferably, LAN interface 230 includes 20 network ports and each of the ports can be assigned any one of the 8 Ethernet segments. Alternatively, LAN interface 230 can be a port switching hub that enables automated assignment of ports to network segments. The LAN interface 230 can be connected to a network router or gateway to provide connectivity to other host systems (not shown).

In this embodiment, each of the 8 Ethernet segments 270 forms an IP network and each CPS utilizes a data tunnel and a data tunneling protocol to establish a data connection between a remote system and a host system. In one preferred embodiment, the remote system uses the Point-to-Point Protocol (PPP) to establish a PPP data connection with the communication system over the WAN. The data tunneling protocol encapsulates the data with the higher level protocols intact and transports this data through the data tunnel using the IP protocol. The data tunneling protocol can be any well known tunneling protocol including Point-to-Point Tunneling Protocol (PPTP), Layer 2 Forwarding (L2F) or Layer 2 Tunneling Protocol (L2TP).

Through the use of data tunneling, the connection to the host system is equivalent to the serial/asynchronous connection between a pool of analog or digital modems and a host system such as a communication or remote access server (RAS). One disadvantage of the prior art is that each modem of the pool is dedicated to a port on the communications server. One of the advantages of the present invention is that a remote system can be selectively connected to one of many different host systems, thus any dial up connection can be connected to any communications server or RAS.

Figure 3:
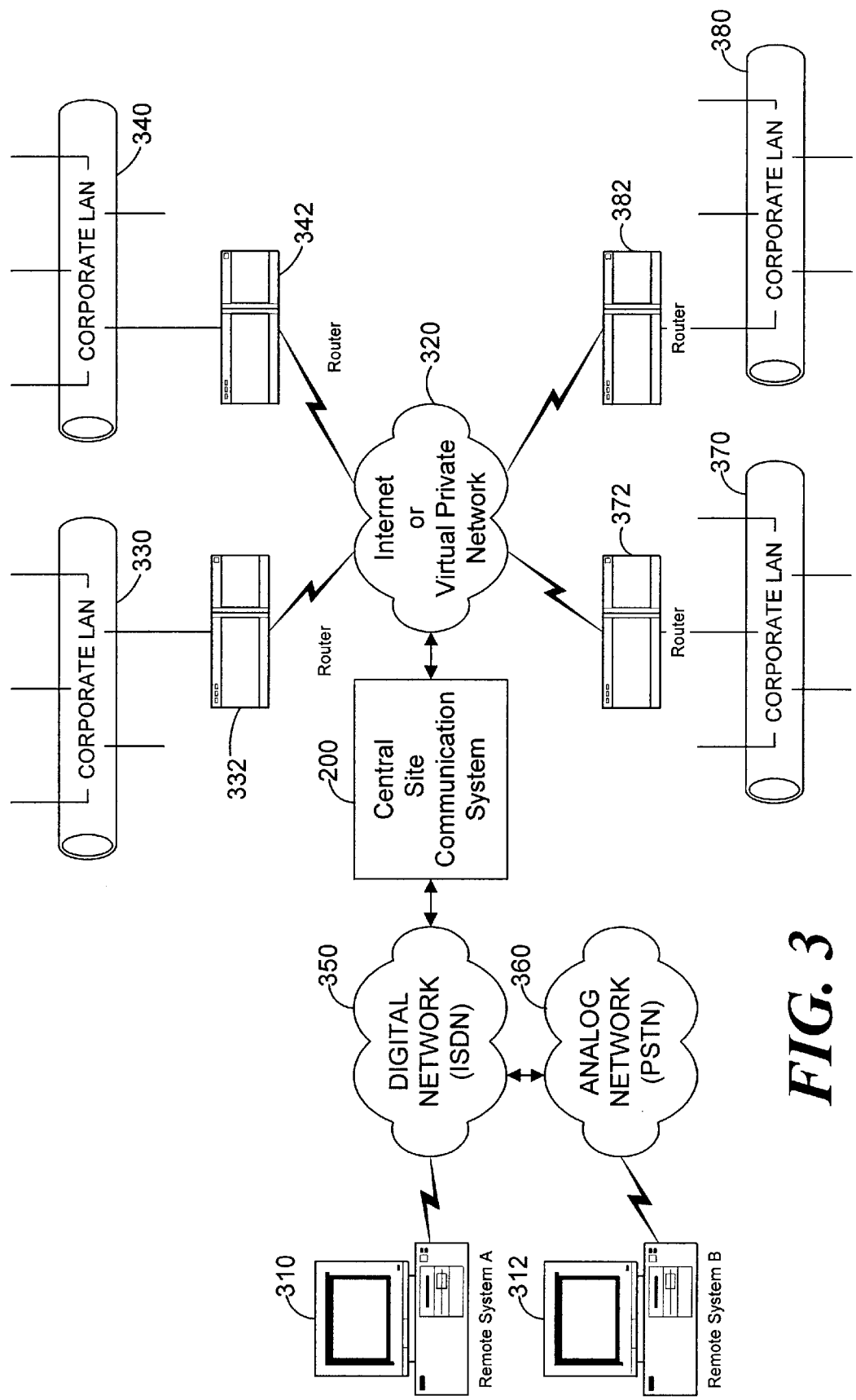
FIG. 3 is a block diagram showing a central site call routing apparatus in accordance with an alternate embodiment of the invention.

FIG. 3 shows how the communication system 200 in accordance with the invention can be utilized to provide a point of presence (POP) for virtual private network (VPN) services. Virtual private data networks allow several organizations such as corporations to provide remote access to the internal corporate LAN of each organization utilizing a public network such as the Internet. This is accomplished using communication system 200 to establish connections using data tunnels with a corporate router 332, 342, 372, 382 connected to the Internet 320. The communication system 200 establishes a private connection with a corporate LAN 330, 340, 370, 380 as a function of the information characteristic of the remote system 310, 312. For example, using the number called by remote system A 310, the communication system 200 can establish a data connection with corporate LAN 330 using a data tunnel and using the number called by remote system B 312, the communication system can establish a data connection with corporate LAN 380 using a separate data tunnel. Thus, two remote users can access their respective corporate LANs using a public data network as if they had a direct private connection.

In the preferred embodiment, the communication system is based upon the Oncore Switching Hub available from 3Com Corporation, Southborough, Mass. The Oncore Switching Hub is modified to include the TDM buses by Microcom Inc., Norwood, Mass. The LAN interface module is also available from Microcom, Inc., Norwood Mass. The WAN interface modules can be constructed from conventional ISDN, T1 or modem interface modules. The Host interfaces can also be constructed from conventional LAN repeater and serial interface components. Appendix A includes a computer program that can be executed by a microprocessor on a WAN interface module to implement the CPS functions in accordance with the preferred embodiment of the invention.

Figure 4:
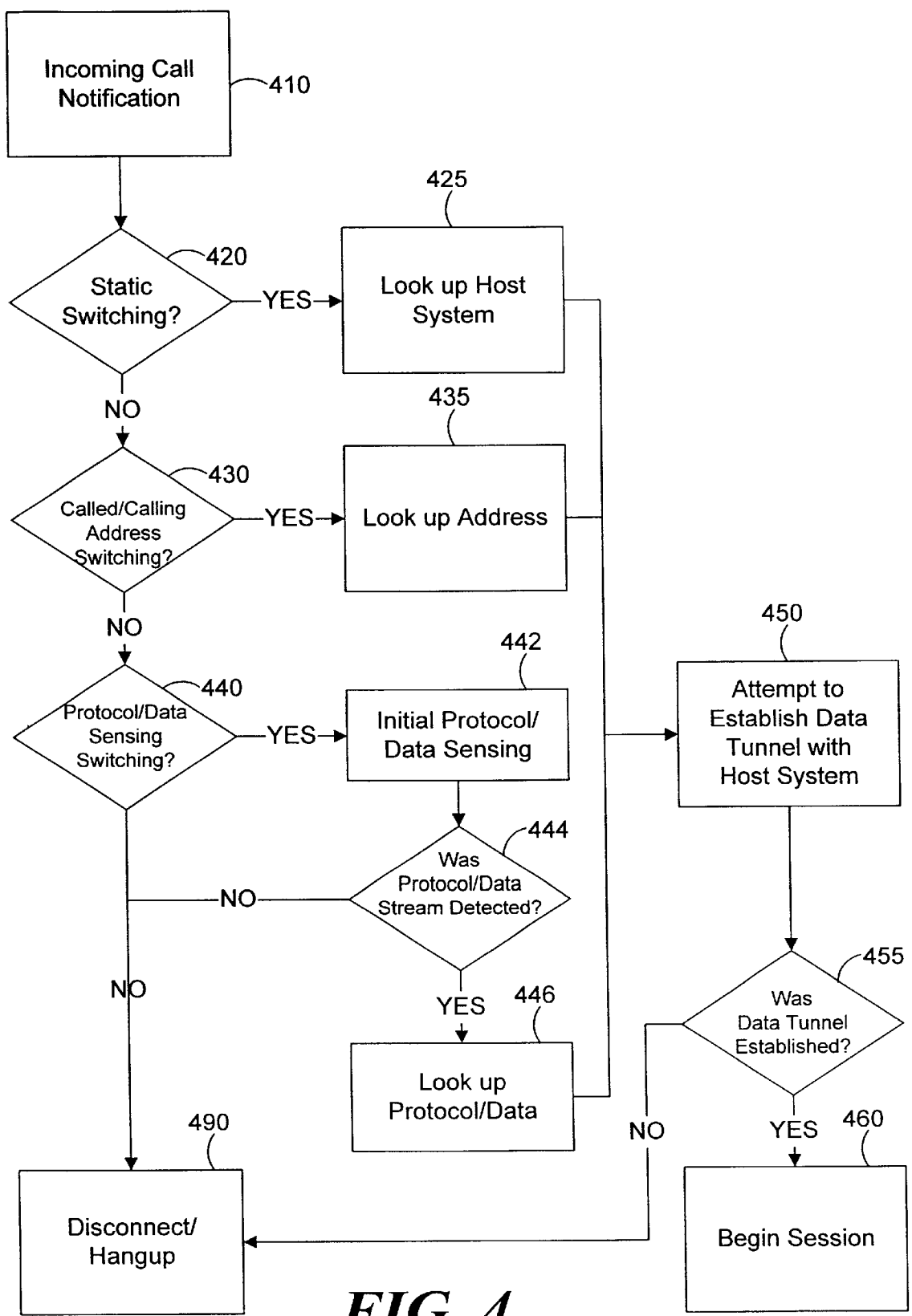
FIG. 4 is a flow chart showing the process of establishing a data connection between a remote system and a host system in accordance with one embodiment of the invention.

FIG. 4 shows a flow chart of a method 400 for processing a call by a central site communication system in accordance with one preferred embodiment of the invention. The method begins when the WAN interface receives an incoming call notification from the network. The CPS receives an incoming call notification 410 from the WAN interface. The CPS determines whether the communication system is configured for static switching 420, called/calling address switching 430 or protocol/data sensing 440. If the communication system is configured for static switching 420, the CPS looks up the host system in the call processing table 425 that has been statically assigned to receive the call. If the communication system is configured for called/calling address switching 430, the CPS gets the called/calling address information from the WAN interface and looks up the host system in the call processing table 435 based upon the address received from the WAN interface. If the communication system is configured for protocol/data sensing, the CPS initiates the protocol/data sensing process 442. Protocol/data sensing can be accomplished by answering the call and receiving data from the remote system over the network. The data is evaluated to determine whether a protocol is recognized (protocol sensing) or whether the data is recognized (data sensing). The CPS can also prompt the remote system for input such as a log-in identifier or password. If the protocol/data is not detected within a predefined time limit, preferably 10 seconds 444 the CPS instructs the WAN interface to disconnect or hangup the incoming call 490. If the protocol/data is detected, the CPS looks up the host system in the call processing table 446 based upon the protocol/data detected.

After a host system is determined, the CPS attempts to establish a data tunnel with the host system 450 across the host connection medium using a preselected protocol or a protocol identified in the look up table. If the data tunnel is successfully established, the data session begins 460 and the system maintains the data connection until either system initiates a disconnect. If a data tunnel cannot be established, the CPS instructs the WAN interface to disconnect or hangup the incoming call 490.

In an alternative embodiment, CPS can be configured to utilize multiple criteria as the basis for determining the host system to establish a connection with. For example, the CPS can utilize the called/calling address information to determine whether the call should be statically routed, routed based upon the called/calling address information or protocol/data sensing. In one preferred embodiment, the CPS prompts the remote system for a identifier and password and based upon the identifier, the CPS can establish a connection with an authorized host service. If the remote system is authorized to access multiple host services, the CPS can present a menu to the remote system to allow the remote system to select the desired host service.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A communication system for transferring data between a remote system and any one of a plurality of host systems, said communication system being adapted to be coupled to a first network and said remote system being connected to either said first network or a second network, wherein said second network is connected to said first network, said communication system comprising:

a first interface means for connecting said communication system to said first network, said first interface means including means for receiving information characteristic of said remote system from said first network;

a second interface means for receiving and processing data from said first interface means;

a first data bus connecting said first interface means and said second interface means to enable said data to be transferred between said first interface means and said second interface means;

at least one host interface means for connecting said communication system to said plurality of host systems through a host connection medium a first call processing system, coupled to said first interface means, adapted for receiving said information characteristic of said remote system and a second call processing system, coupled to said second interface means adapted for selectively establishing a data connection between said first network and one of said host systems through said host interface means as a function of said information characteristic of said remote system; and a second data bus separate from the first data buss and connecting said first call processing system and said second call processing system to said host interface means to enable said first call processing system and said second call processing system to transfer data to and receive data from said host interface means.

2. A communication system according to claim 1 wherein said first call processing system includes means for determining whether said remote system is connected to said first network or said second network and for establishing a data connection through said second interface means if said remote system is connected to said second network.

3. A communication system in accordance with claim 1 wherein said information characteristic of said remote system includes a remote system network identifier used to identify the connection of the remote system to said first network or said second network and said call processing system establishes a connection with one of said host systems as a function of said remote system network identifier.

4. A communication system in accordance with claim 3 wherein said first network and said second network are interconnected parts of a telephone network and said remote system network identifier includes a telephone number used to establish a connection with said remote system, and said call processing system establishes a connection with one of said host systems as a function of said telephone number.

5. A communication system in accordance with claim 1 wherein said information characteristic of said remote system includes a destination system network identifier used by said remote system to establish a connection with said communication system over said first network and said call processing system establishes a connection with one of said host systems as a function of said destination system network identifier.

6. A communication system in accordance with claim 5 wherein said first network and said second network are interconnected parts of a telephone network and said destination system network identifier includes a telephone number used by the remote system to establish a connection with said communication system, and said call processing system establishes a connection with one of said host systems as a function of said telephone number.

7. A communication system in accordance with claim 1 wherein said first network is capable of transferring data in accordance with a plurality of data communication protocols and said communication system further includes sensing means for determining the communication protocol used by said remote system and said call processing system establishes a connection with one of said host systems as a function of the communication protocol determined by said sensing means.

8. A communication system in accordance with claim 7 wherein said first network and said second network are interconnected parts of a telephone network and said remote system utilizes an ISDN communication protocol for transferring data between said remote system and said communication system and said call processing system establishes a connection with one of said host systems as a function of said ISDN communication protocol.

9. A communication system in accordance with claim 1 wherein said information characteristic of said remote system includes data transmitted from the remote system to said communication system over said first network or said second network and said call processing system establishes a connection with one of said host systems as a function of said data received from said remote system.

10. A communication system in accordance with claim 9 wherein said first network and said second network are interconnected parts of a telephone network and said data includes a log in identifier or password and said call processing system establishes a connection with one of said host systems as a function of said log in identified or said password.

11. A communication system in accordance with claim 1 wherein said host interface means includes means for establishing a data tunnel over said host communication medium between said communication system and said host system.

12. A communication system in accordance with claim 1 wherein said host interface means includes means for utilizing a data tunneling protocol to transfer data received from said remote system over said host communication medium between said communication system and said host system.

13. A communication system in accordance with claim 1 wherein said host communication medium includes a local area network medium.

14. A communication system in accordance with claim 1 wherein said host communication medium includes a serial communications medium.

15. A communication system in accordance with claim 1 wherein said host communication medium includes a parallel communications medium.

16. A communication system in accordance with claim 1 further comprising
    a system controller adapted for storing information characteristic of at least one of said host systems and for transferring said information characteristic of said host systems to said call processing system, wherein said call processing system establishes a data connection between said first network and one of said host systems as function of said information characteristic of said remote system and said information characteristic of said host systems.

17. A method of establishing a data connection between a remote system and any one of a plurality of host systems, wherein said host systems are coupled to a first network and said remote system is connected to either said first network or a second network and said second network is connected to said first network, said method comprising the steps of:
    providing a first call processing system;
    utilizing said first call processing system to establish a data connection between said remote system and a communication system;
    receiving, at said first call processing system, information characteristic of said remote system from said first network;
    providing a second call processing system;
    sending data from said first cell processing system over a first data bus to a second call processing system; and
    utilizing said second call processing system to establish a data connection between said communication system and one of said host systems over a second data bus being separate from the first data bus as a function of said characteristic information.

18. A method of establishing a data connection between a remote system and any one of a plurality of host systems according to claim 17 further comprising the steps of
    comparing said information characteristic of said remote system with values of possible characteristic information from a table, and
    establishing a data connection between said communication system and one of said host systems as a function of connection information provided by said table.

19. A method of establishing a data connection between a remote system and any one of a plurality of host systems according to claim 17 wherein
    said information characteristic of said remote system includes a remote system network identifier and
    said step of establishing a data connection between said communication system and one of said host systems as a function of said characteristic information, establishes said data connection as a function of said remote system network identifier.

20. A method of establishing a data connection between a remote system and any one of a plurality of host systems according to claim 17 wherein
    said information characteristic of said remote system includes a destination system network identifier used by said remote system to establish a connection with one of said host systems and
    said step of establishing a data connection between said communication system and one of said host systems as a function of said characteristic information, establishes said data connection as a function of said destination system network identifier.

21. A method of establishing a data connection between a remote system and any one of a plurality of host systems according to claim 17, wherein said remote system includes means for communicating with said host system in accordance with at least one of a plurality of data communication protocols, said method further comprising the step of
    determining the communication protocol used by the remote system, and wherein
    said step of establishing a data connection between said communication system and one of said host systems as a function of said characteristic information, establishes said data connection as a function of said communication protocol used by said remote system.

22. A method of establishing a data connection between a remote system and any one of a plurality of host systems according to claim 17 further comprising the step of
    receiving data transmitted from the remote system, and wherein
    said step of establishing a data connection between said communication system and one of said host systems as a function of said characteristic information, establishes said data connection as a function of said data received from said remote system.

23. A method of establishing a data connection between a remote system and any one of a plurality of host systems according to claim 17, wherein
    said step of establishing a data connection between said communication system and one of said host systems as a function of said characteristic information, includes establishing a data tunnel utilizing a data tunneling protocol between said communication system and said host system.

24. A communication system for transferring data between a remote system and any one of a plurality of host systems, said communication system being adapted to be coupled to a wide area network (WAN) and said remote system being also connected to said WAN, said WAN permitting the transfer of data utilizing at least one of a plurality of WAN data communication protocols, said communication system comprising:
    a WAN interface adapted for connecting said communication system to said WAN and for communicating with said WAN in accordance with one of said WAN data communication protocols, said first WAN interface including means for receiving information characteristic of said remote system from said WAN;
    a communications interface adapted for receiving and processing data from said first WAN interface;
    a first data bus connecting said WAN interface to said communications interface to enable data to be transferred between said WAN interface and said communications interface;
    at least one host interface adapted for connecting said communication system to said plurality of host systems through a host connection medium;
    a first call processing system, coupled to said WAN interface, adapted for receiving said information characteristic of said remote system and a second call processing system, coupled to said communications interface, adapted for selectively establishing a data connection between said WAN and one of said host systems through said host interface as a function of said information characteristic of said remote system; and a second data bus being separate from the first data bus and connecting said first call processing system and said second call processing system to said host interface to enable said first call processing system and said second call processing system to transfer data to and receive data from said host interface.

25. A communication system for transferring data between a remote system and a plurality of host systems, said communication system being connected to a first wide area network (WAN) and said remote system being also connected to said first WAN or a second WAN, wherein said first WAN and said second WAN are interconnected, each of said WANs permits the transfer of data utilizing at least one of a plurality of WAN data communication protocols, said communication system comprising:

a first WAN interface adapted for connecting said communication system to said first WAN and for communicating with said first WAN in accordance with one of said WAN data communication protocols, said first WAN interface including means for receiving information characteristic of said remote system from said first WAN;

a second WAN interface adapted for connecting said communication system to said second WAN and for communicating with said second WAN in accordance with one of said WAN data communication protocols, said second WAN interface including means for receiving information characteristic of said remote system from said second WAN;

a first data bus for connecting said first WAN interface and said second WAN interface to enable data communication there between;

at least one host interface adapted for connecting said communication system to said plurality of host systems through a host connection medium;

said first WAN interface further including a first call processing system adapted for receiving said information characteristic of said remote system and for selectively establishing a data connection between said first WAN and one of said host systems through said host interface as a function of said information characteristic of said remote system;

said second WAN interface further including a second call processing system adapted for receiving said information characteristic of said remote system and for selectively establishing a data connection between said second WAN and one of said host systems through said host interface as a function of said information characteristic of said remote system; and a second data bus being separate from said first data bus and connecting said first call processing system to said second call processing system.

26. A communication system in accordance with claim 25 further comprising a data bus for transferring data between said first WAN interface and said second WAN interface; and wherein said first call processing system includes means for determining whether said remote system is connected to said first WAN or said second WAN and for establishing a connection over said data bus from said first WAN interface to said second WAN interface and said second call processing system receives information characteristic of said remote system from said first WAN interface and selectively establishes a data connection between said first WAN and one of said host systems through said host interface as a function of said information characteristic of said remote system.

27. A communication system for transferring data between a remote system and any one of a plurality of host systems, said communication system being adapted to be coupled to a first network and said remote system being connected to either said first network or a second network, wherein said second network is connected to said first network, said communication system comprising:

a first network interface adapted for connecting said communication system to said first network, said first network interface being adapted for receiving information characteristic of said remote system from said first network;

a second network interface adapted for receiving and processing data from said first network interface;

a first data bus connecting said first network interface and said second network interface to enable said data to be transferred between said first network interface and said second network interface;

at least one host interface adapted for connecting said communication system to said plurality of host systems through a host connection medium;

a call processing system, coupled to said first network interface, adapted for receiving said information characteristic of said remote system and for selectively establishing a data connection between said first network and one of said host systems through said host interface as a function of said information characteristic of said remote system; and a second data bus being separate from the first data bus for connecting said first call processing system and said second call processing system to said host interface to enable said first call processing system and said second call processing system to transfer data to and receive data from said host interface.

28. A communication system according to claim 27 wherein said first call processing system is adapted for determining whether said remote system is connected to said first network or said second network and for establishing a data connection through said second network interface if said remote system is connected to said second network.

29. A communication system in accordance with claim 27 wherein said information characteristic of said remote system includes a remote system network identifier used to identify the connection of the remote system to said first network or said second network and said call processing system establishes a connection with one of said host systems as a function of said remote system network identifier.

30. A communication system in accordance with claim 29 wherein said first network and said second network are interconnected parts of a telephone network and said remote system network identifier includes a telephone number used to establish a connection with said remote system, and said call processing system establishes a connection with one of said host systems as a function of said telephone number.

31. A communication system in accordance with claim 27 wherein said information characteristic of said remote system includes a destination system network identifier used by said remote system to establish a connection with said communication system over said first network and said call processing system establishes a connection with one of said host systems as a function of said destination system network identifier.

32. A communication system in accordance with claim 31 wherein said first network and said second network are interconnected parts of a telephone network and said destination system network identifier includes a telephone number used by the remote system to establish a connection with said communication system, and said call processing system establishes a connection with one of said host systems as a function of said telephone number.

33. A communication system in accordance with claim 27 wherein said first network is capable of transferring data in accordance with a plurality of data communication protocols and said communication system further includes a sensing element adapted for determining the communication protocol used by said remote system and said call processing system establishes a connection with one of said host systems as a function of the communication protocol determined by said sensing element.

34. A communication system in accordance with claim 33 wherein said first network and said second network are interconnected parts of a telephone network and said remote system utilizes an ISDN communication protocol for transferring data between said remote system and said communication system and said call processing system establishes a connection with one of said host systems as a function of said ISDN communication protocol.

35. A communication system in accordance with claim 27 wherein said information characteristic of said remote system includes data transmitted from the remote system to said communication system over said first network or said second network and said call processing system establishes a connection with one of said host systems as a function of said data received from said remote system.

36. A communication system in accordance with claim 35 wherein said first network and said second network are interconnected parts of a telephone network and said data includes a log in identifier or password and said call processing system establishes a connection with one of said host systems as a function of said log in identified or said password.

37. A communication system in accordance with claim 27 wherein said host interface is adapted for establishing a data tunnel over said host communication medium between said communication system and said host system.

38. A communication system in accordance with claim 27 wherein said host interface is adapted for utilizing a data tunneling protocol to transfer data received from said remote system over said host communication medium between said communication system and said host system.

39. A communication system in accordance with claim 27 wherein said host communication medium includes a local area network medium.

40. A communication system in accordance with claim 27 wherein said host communication medium includes a serial communications medium.

41. A communication system in accordance with claim 27 wherein said host communication medium includes a parallel communications medium.

42. A communication system in accordance with claim 27 further comprising
a system controller adapted for storing information characteristic of at least one of said host systems and for transferring said information characteristic of said host systems to said call processing system, wherein said call processing system establishes a data connection between said first network and one of said host systems as function of said information characteristic of said remote system and said information characteristic of said host systems.

43. A communication system in accordance with claim 1 wherein said second data bus includes a network medium.

44. A communication system in accordance with claim 24 wherein said second data bus includes a network medium.

45. A communication system in accordance with claim 27 wherein said second data bus includes a network medium.

46. A communication system for transferring data between a remote system and any one of a plurality of host systems, said communication system being adapted to be coupled to a first network and said remote system being connected to either said first network or a second network, wherein said second network is connected to said first network, said communication system comprising:
a first interface means for connecting said communication system to said first network, said first interface means including means for receiving information characteristic of said remote system form said first network;
a second interface means for receiving and processing data from said first interface means;
a first data bus connecting said first interface means and said second interface means to enable said data to be transferred between said first interface means and said second interface means;
at least one host interface means for connecting said communication system to said plurality of host systems through a host connection medium
a first call processing system, coupled to said first interface means, adapted for receiving said information characteristic of said remote system and a second call processing system, coupled to said second interface means adpated for selectively establishing a data connection between said first network and one of said host systems through said host interface means as a function of said information characteristic of said remote system; and
a network data bus separate from the first data bus and connecting said first call processing system and said second call processing system to said host interface means to enable said first call processing system and said second call processing system to transfer data to and receive data from said host interface means.

47. A communication system for transferring data between a remote system and any one of a plurality of host systems, said communication system being adapted to be couple to a wide area network (WAN) and said remote system being also connected to said WAN, said WAN permitting the transfer of data utilizing at least one of a plurality of WAN data communication protocols, said communication system comprising:
a WAN interface adapted for connecting said communication system to said WAN and for communicating with said WAN in accordance with one of said WAN data communication protocols, said first WAN interface including means for receiving information characteristic of said remote system from said WAN;
a communications interface adapted for receiving and processing data from said first WAN interface;
a first data bus connecting said WAN interface to said communications interface to enable data to be transferred between said WAN interface and said communication interface;

at lest one host interface adapted for connecting said communication system to said plurality of host systems through a host connection medium;

a first call processing system, couple to said WAN Interface, adapted for receiving said information characteristic of said remote system and a second call processing system, coupled to said communication interface, adapted for selectively establishing a data connection between said WAN and one of said host systems through said host interface as a function of said information characteristic of said remote system; and a network data bus being separate from the first data bus and connecting said first call processing system and said second call processing system to said host interface to enable said first call processing system and said second call processing system to transfer data to and receive data from said host interface.

48. A communication system for transferring data between a remote system and any one of a plurality of host systems, said communication system being adapted to be coupled to a first network and said remote system being connected to either said first network or a second network, wherein said second network is connected to said first network, said communication system comprising:

a first network interface adapted for connecting said communication system to said first network, said first network interface being adapted for receiving information characteristic of said remote system from said first network;

a second network interface adpated for receiving and processing data from said first network interface;

a first data bus connecting said first network interface and said second network interface to enable said data to be transferred between said first network interface and said second network interface;

at least one host interface adapted for connecting said communication system to said plurality of host systems through a host connection medium;

a call processing system, coupled to said first network interface, adapted for receiving said information characteristic of said remote system and for selectively establishing a data connection between said first network and one of said host systems through said host interface as a function of said information characteristic of said remote system; and a network data bus being separate from the first data bus for connecting said first call processing system and said second call processing system to said host interface to enable said first call processing system and said second call processing system to transfer data to and receive data from said host interface.

\* \* \* \* \*

UNITED STATES PATENT AND TRADEMARK OFFICE
CERTIFICATE OF CORRECTION

PATENT NO. : 6,285,680 B1
DATED : September 4, 2001
INVENTOR(S) : Steinka et al.

Page 1 of 1

It is certified that error appears in the above-identified patent and that said Letters Patent is hereby corrected as shown below:

<u>Column 13,</u>
Line 53, after "bus" insert -- being -- and "buss" should be replaced with -- bus --.

Signed and Sealed this

Twenty-first Day of May, 2002

Attest:

Attesting Officer

JAMES E. ROGAN
*Director of the United States Patent and Trademark Office*